United States Patent [19]

Chance et al.

[11] Patent Number: 4,628,157
[45] Date of Patent: Dec. 9, 1986

[54] BIDIRECTIONAL ADAPTIVE VOICE FREQUENCY REPEATER

[75] Inventors: Christopher P. Chance, Winston-Salem; Ralph P. Coble, Jr., Greensboro; Edwin C. Ingle, Jamestown; Joye A. Jones, Greensboro, all of N.C.

[73] Assignee: AT&T Bell Laboratories, Murray Hill, N.J.

[21] Appl. No.: 648,327

[22] Filed: Sep. 7, 1984

[51] Int. Cl.[4] .............................................. H04B 3/20
[52] U.S. Cl. ....................................... 379/410; 379/345
[58] Field of Search ............... 179/170.2, 170.6, 170.8; 370/32; 333/172

[56] References Cited

U.S. PATENT DOCUMENTS

| | | | |
|---|---|---|---|
| 2,961,613 | 11/1960 | Eschner, Jr. | 333/172 X |
| 3,499,999 | 3/1970 | Sondhi | 179/170.2 |
| 3,500,000 | 3/1970 | Kelly et al. | 179/170.2 |
| 4,074,087 | 2/1978 | Blake, Jr. et al. | 179/170.2 |
| 4,268,727 | 5/1981 | Agrawal et al. | 179/170.2 |

FOREIGN PATENT DOCUMENTS 1563742 3/1980 United Kingdom .

OTHER PUBLICATIONS

Microelectronics, Jocob Millman, McGraw Hill Book Company, New York, 1979 "Nomogram for Multivibrator Design", W. R. Luckett, *Electronic Engineering*, Nov. 1951, pp. 448–449.
"Driftless", F. Bradley, *Electronics* vol. 25, No. 4, pp. 144–148, Apr. 1952.
"A New Digital Echo Canceller for Two-Wire Full-Duplex Data Transmission" K. Mueller, IEEE Trans on Comm., vol. COM-24, No. 9, Sept. 1976, pp. 956–962.
G. P. Eckley et al., "Digital Signal Solves Hybrid Balance Puzzle", *Telephone Engineer & Management*, Aug. 1, 1983, pp. 39–46.
D. L. Duttweiler, "Bell's Echo-Killer Chip", *IEEE Spectrum*, Oct. 1980, pp. 34–37.

*Primary Examiner*—Gene Z. Rubinson
*Assistant Examiner*—R. Vaas
*Attorney, Agent, or Firm*—Thomas Stafford

[57] ABSTRACT

A "high" pass filter is employed to shape the low frequency input characteristic to a bidirectional repeater including echo cancelers. This frequency shaping eliminates excessive low frequency signal components from being supplied to the echo cancelers. Consequently, the number of taps, i.e., amplitude coefficients, required in the echo cancelers is minimized.

10 Claims, 6 Drawing Figures

BIDIRECTIONAL ADAPTIVE VOICE FREQUENCY REPEATER

TECHNICAL FIELD

This invention relates to transmission networks and, more particularly, to bidirectional adaptive voice frequency repeaters.

BACKGROUND OF THE INVENTION

Adaptive voice frequency repeaters which employ echo cancelers to maximize return loss, or, stated another way, to minimize reflected signals, tend to be susceptible to "low" frequency signals. The echo cancelers have a limited number of taps, i.e., amplitude coefficients, to synthesize an impulse response characteristic of an echo path. Problems arise when excessive low frequency energy is in the input to the cancelers because of the limited number of taps. That is, a number of the taps are needed to deal with the low frequency signals and, then, there is an insufficient number of taps to synthesize a proper impulse response for the voice frequency band echo path.

One way to correct these problems is simply to increase the number of taps in the echo canceler. This solution, however, is unacceptable in most applications because of the need for additional memory, processing real estate on a chip and the like. All of which increase the cost of the echo canceler.

SUMMARY OF THE INVENTION

The problems resulting from the excessive low frequency signal components incoming to the repeater are overcome, in accordance with an aspect of the invention, by preemphasizing the input frequency response characteristic of signals incoming to the echo canceler or echo cancelers employed in a voice frequency repeater.

In one embodiment of the invention, the frequency response characteristic is modified by employing a filter to attenuate "low" frequency signals incoming to the echo canceler(s).

BRIEF DESCRIPTION OF THE DRAWING

The invention will be more fully understood from the following detailed description of an illustrative embodiment taken in connection with the appended figures in which.

DETAILED DESCRIPTION

Figure 1:
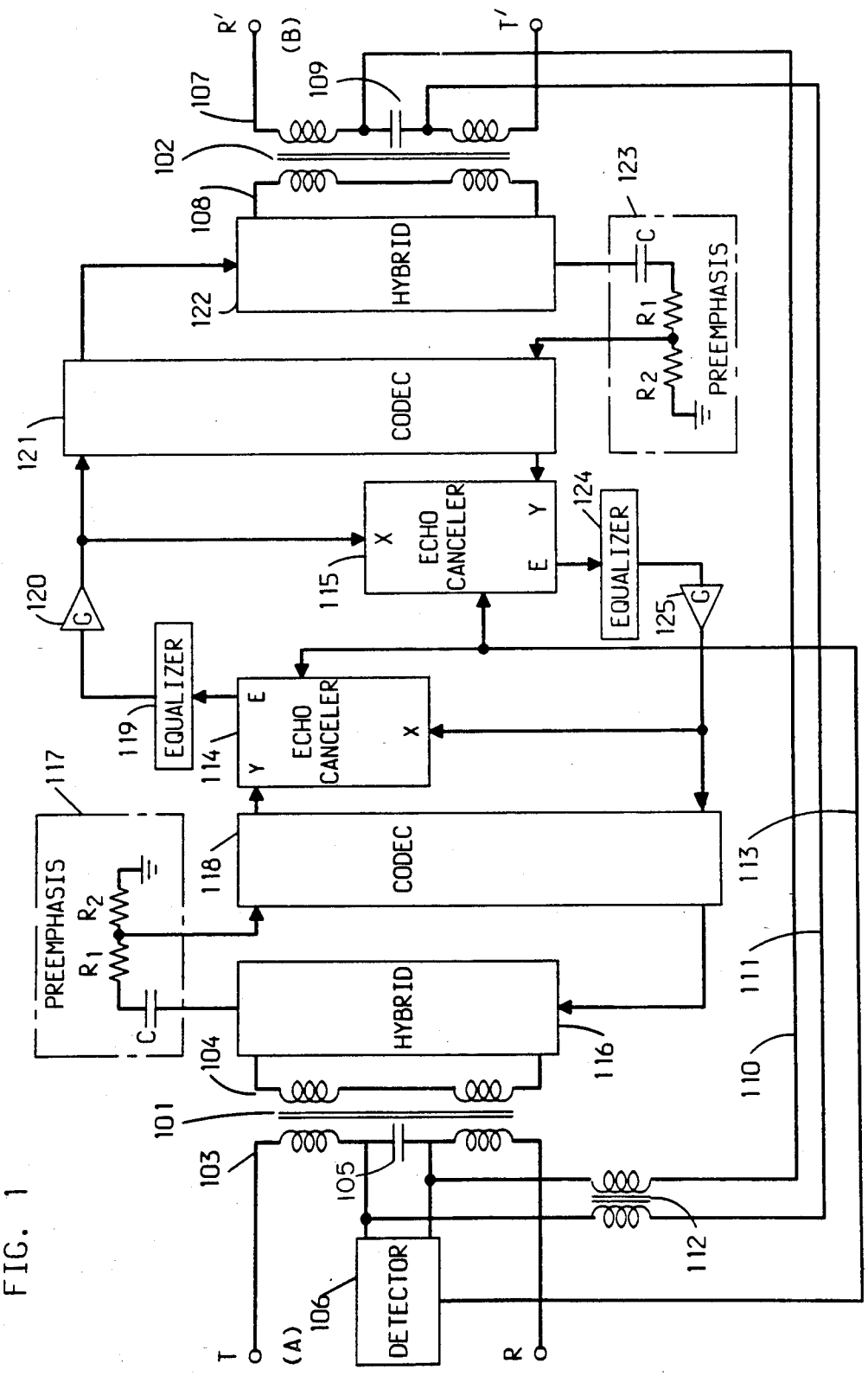
FIG. 1 shows in simplified block diagram form an adaptive voice frequency band repeater including an embodiment of the invention.

FIG. 1 shows in simplified block diagram form an automatically adaptive voice frequency repeater including an embodiment of the invention. The repeater of FIG. 1 is intended to enhance voice frequency signals being transmitted on a 2-wire transmission path or facility.

Accordingly, shown in FIG. 1 are coupling transformers 101 and 102 which are adapted for connecting the subject repeater to bidirectional 2-wire transmission facilities A and B, respectively. Transformer 101 is adapted to connect bidirectional 2-wire facility A to the repeater via terminals T and R. Transformer 101 includes primary winding 103 and secondary winding 104. Winding 103 includes so-called midpoint capacitor 105 for extracting signaling information. Also developed across capacitor 105 are so-called "out-of-band" signals, for example, ringing, dial pulses and the like. Detector 106 is connected across midpoint capacitor 105 and is employed to detect the presence of "large" out-of-band signals incoming to the subject repeater from either facility A or B. The connection of detector 106 in the repeater is important so that longitudinal balance of the repeater is not disturbed. It is also important to note that the "out-of-band" large signal be detected as such. This is because the low frequency components of the ringing signal, dial pulses and the like having significant energy may not be readily detected in the voice frequency band.

Transformer 102 also includes primary winding 107 and secondary winding 108. Winding 107 also includes midpoint capacitor 109. Transformer 102 is adapted to connect bidirectional 2-wire facility B to the repeater via terminals T' and R'.

Signaling information from facilities A and B are bypassed around the subject repeater via circuit connections 110 and 111 which include coils of inductor 112. Consequently, any ringing signals, dial pulses and the like from 2-wire facility B and developed across capacitor 109 are also supplied to detector 106. A control signal output from detector 106 indicating the presence of such "large" signals having amplitudes above a predetermined threshold value is supplied via circuit connection 113 to echo cancelers 114 and 115. As will be further explained below, echo cancelers 114 and 115 are responsive to the control signal from detector 106 to inhibit updating of the echo canceler impulse response characteristic during the presence of such "large" incoming signals.

"Large" is determined relative to the peak amplitude of the so-called normal voice frequency signals, i.e., voice, tones, multifrequency tones and similar signals. In this system the peak amplitude of such voice frequency signals is typically in the range of up to 5 volts maximum. Consequently, the large signal threshold in this example, not to be construed as limiting the scope of the invention, is set at approximately 20 volts peak. However, in other systems the large signal threshold may be set at a significantly lower peak amplitude depending on the amplitude range of the normal voice frequency signals.

First and second terminals of winding 104 are connected to hybrid network 116. Hybrid 116 may be any of the hybrid arrangements known in the art for coupling a 2-wire facility to a 4-wire facility. Preferably, hybrid 116 is of the electronic type. Hybrid network 122 is identical to hybrid network 116.

The incoming signal output from hybrid 116 is supplied to preemphasis circuit 117. Preemphasis circuit 117 includes a filter made up of capacitor C and resistors $R_1$ and $R_2$ and is employed, in accordance with an aspect of the invention, to shape the lower frequency portion of the repeater input. The low frequency, i.e., below 400 Hz, shaping of the repeater input signal frequency characteristic is important to minimize the number of taps required in each of echo cancelers 114 and 115 in order to generate the desired impulse response characteristic for cancelling reflected signals in the voice frequency band, i.e., 200 Hz to 3200 Hz.

Figure 4:
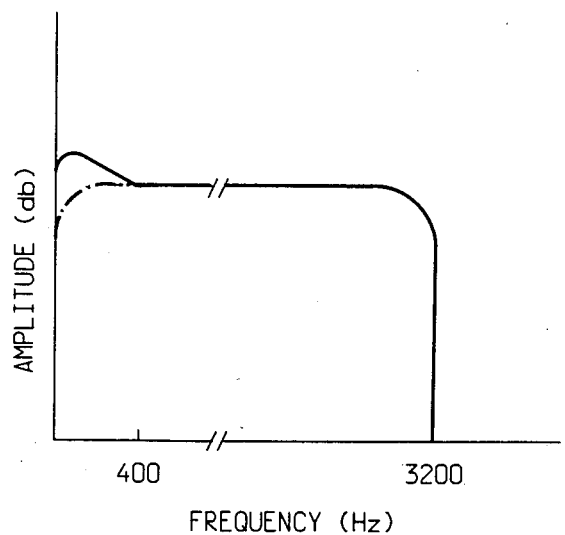
FIG. 4 depicts a frequency response characteristic useful in describing the invention.
Figure 5:
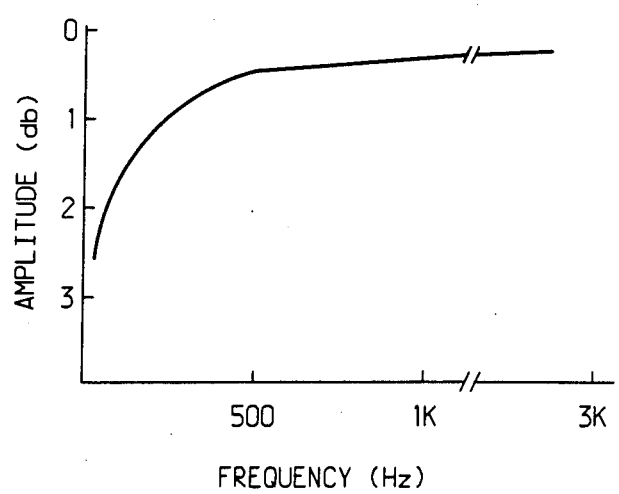
FIG. 5 shows another frequency response characteristic also useful in describing the invention.

As indicated above, incoming signals to the repeater typically have excessive low frequency signal components. A typical waveform showing the excessive low frequency, i.e., below 400 Hz, signal components in the repeater input frequency characteristic is shown in FIG. 4 in solid outline. The approximate shaping of the low frequency portion of the frequency characteristic is shown in dashed outline. It should be noted, however, that the roll-off of the low frequency end of the characteristic must meet the roll-off specifications for voice frequency transmission. This is realized, in accordance with an aspect of the invention, by employing the "high" pass filter arrangement of preemphasis circuits 117 and 123. The filter characteristic being $$V_{out} = V_{in}\left(\frac{j\omega CR_2}{1 + j\omega C(R_1 + R_2)}\right) \quad (1)$$

where $V_{in}$ is the signal input to the preemphasis circuit, $V_{out}$ is the output from the preemphasis circuit and $\omega$ is $2\pi f$, where f is the frequency of the incoming signal components. The low frequency attenuation obtained by use of the filter described by equation (1) is shown in FIG. 5. The roll-off specifications for voice frequency transmission in a given system is 3.0 dB at 400 Hz with an objective of 2.5 dB. As shown in FIG. 5, the roll-off obtained by employing preemphasis circuits 117 and 123 is well within those overall specifications and still eliminates, in accordance with an aspect of the invention, the excessive low frequency components. Thus, the need is eliminated for an increased number of taps in echo cancelers 114 and 115. Preemphasis circuit 123 is identical to preemphasis circuit 117. It is important to note that the echo signal passes through both preemphasis circuits 117 and 123 and, consequently, the effective roll-off is doubled for the echo path signals for each direction of transmission. That is to say, preemphasis circuits 117 and 123 are connected in the repeater so that the "normal" transmission signal is affected once, while the portion of the normal transmission signal that results in an echo signal is affected twice for both directions of transmission. More specifically, preemphasis circuit 117 can be connected in circuit anywhere within the repeater in the "normal" transmission path from facility A to facility B. That is, anywhere in the transmission path from hybrid 116 to hybrid 122. Similarly, preemphasis circuit 123 can be connected in circuit anywhere in the repeater in the "normal" transmission path from facility B to facility A. That is, anywhere in the transmission path from hybrid 122 to hybrid 116. If either of preemphasis circuits 117 or 123 is placed in circuit after CODEC 118 or CODEC 121, respectively, a digital filter would be employed.

An output from preemphasis circuit 117 is supplied to an encoder input of CODEC 118. The encoder of CODEC 118 converts the analog input signal into an 8-bit μ-law PCM digital signal, in well-known fashion. The 8-bit digital signal from CODEC 118 is supplied to a Y input of echo canceler 114. Output E from echo canceler 114 is supplied via equalizer 119 and gain unit 120 to an X input of echo canceler 115 and to a decoder input of CODEC 121. The decoder of CODEC 121 converts the 8-bit μ-law PCM output from echo canceler 114 into an analog output signal, in well-known fashion. The analog output from CODEC 121 is supplied to hybrid 122 and, in turn, via transformer 102 to bidirectional 2-wire facility B.

Echo canceler 114 is employed to cancel the echo signal or reflected signal resulting in the signal transmission from bidirectional 2-wire facility A because of the signal incoming to the repeater from bidirectional 2-wire facility B. Similarly, echo canceler 115 is employed to cancel the echo or reflected signal resulting in the signal transmission from bidirectional 2-wire facility B because of the signal incoming to the repeater from bidirectional facility A. Details of an echo canceler which may be employed for cancelers 114 and 115 are shown in FIG. 2 and described below.

An analog signal from bidirectional 2-wire facility B is supplied via transformer 102, hybrid 122 and preemphasis circuit 123 to an encoder input of CODEC 121. In turn, CODEC 121 converts the analog input signal into a digital μ-law signal which is supplied to the Y input of echo canceler 115. Output E from echo canceler 115 is supplied via equalizer 124 and Gain unit 125 to the X input of echo canceler 114 and to a decoder input of CODEC 118. CODEC 118 converts the 8-bit μ-law output E from echo canceler 115 into an analog signal, in well known fashion. The analog signal from CODEC 118 is supplied via hybrid 116 and transformer 101 to bidirectional 2-wire facility A.

In this example, equalizers 119 and 124 each include an eighth order finite impulse response filter of a type known in the art.

Figure 2:
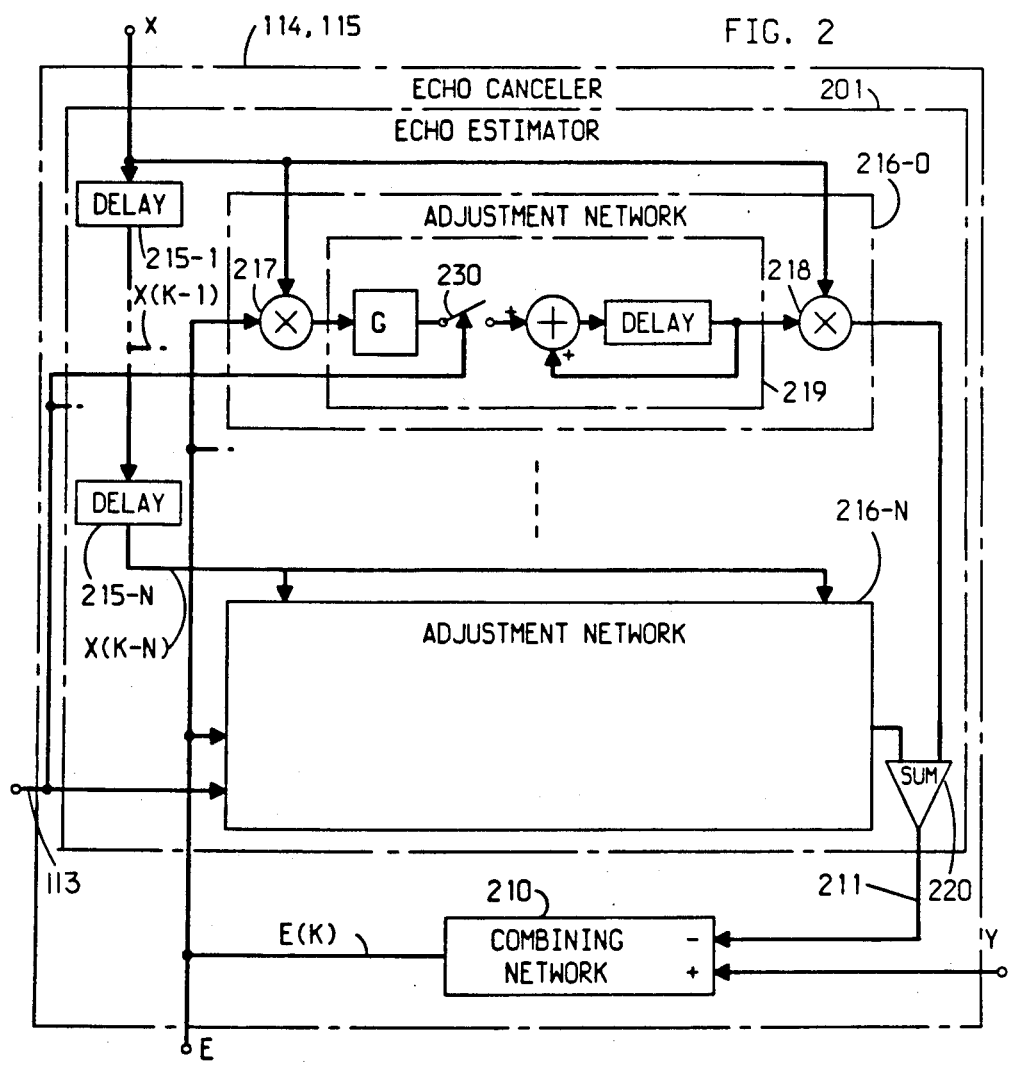
FIG. 2 depicts in simplified form details of the echo cancelers used in the repeater of FIG. 1.

FIG. 2 shows in simplified block diagram form details of an echo canceler which may be advantageously employed for echo cancelers 114 and 115. Echo canceler 114, 115 is broadly similar to echo cancelers disclosed in U.S. Pat. Nos. 3,499,999 and 3,500,000. Also see an article entitled "Bell's Echo-Killer Chip", *IEEE Spectrum*, October 1980, pages 34–37. In this embodiment echo canceler 114, 115 also includes an arrangement for inhibiting updating of an adaptive filter which generates an echo signal estimate in response to an output from detector 106 (FIG. 1) when large input signals are detected on either of 2-wire facilities A or B. This inhibits the echo canceler adaptive filter from adapting, in response to the large amplitude frequency components of the large input signal, to an impulse response which is undesirable for the normal level voice frequency input signals, i.e., speech and white noise.

Briefly, canceler 114, 115 includes an adjustable signal processor, i.e., adaptive filter having a closed loop error control system which is self-adapting in that it automatically tracks signal variation in an outgoing path. More specifically, canceler 114, 115 employs echo estimator 201 including an adaptive transversal filter arrangement for synthesizing a linear approximation of the echo, i.e., an echo estimate.

To this end, far end incoming signal X(K) is usually supplied from a far end talking party over a first transmission path, e.g., lead 202, to a first input of echo canceler 114, 115 and therein to an input of echo estimator 201. Far end signal X(K) may be, for example, a digitally sampled speech signal, where K is an integer identifying the sampling interval. However, because of an impedance mismatch, for example, in hybrid 122 (FIG.

1), a portion of the hybrid input signal is reflected to the far end signal source as an echo. The echo is supplied from an output of hybrid 122 or 116 to the Y input of canceler 115 or 114, respectively, and therein to a first input of combining network 210. A second input to combining network 210 is a signal estimate of the echo generated by echo estimator 201. The echo estimate is supplied via lead 211 from an output of echo estimator 201 to the second input of combining network 210. Combining network 210 generates error signal E(K) corresponding to the algebraic difference between the echo estimate and the Y input to the echo canceler including the undesirable echo. Error signal E(K) is supplied to CODEC 121, 118 (FIG. 1) and to adjustment networks 216-0 through 216-N in estimator 201.

Estimator 201 includes a so-called tapped delay line comprised of delay units 215-1 through 215-N for realizing desired delays at the taps corresponding to convenient Nyquist intervals. Therefore, delayed replicas X(K-1) through X(K-N) of incoming far end signal X(K) are generated at the corresponding taps. The signal at each tap position, namely X(K-1) through X(K-N) as well as X(K), is adjusted in response to error signal E(K). More particularly, signals X(K) through X(K-N) are individually weighted in response to E(K) via a corresponding one of adjustment networks 216-0 through 216-N, respectively. Adjustment networks 216-0 through 216-N each include multipliers 217 and 218, and feedback circuit 219. Feedback circuit 219 adjusts the tap weight to a desired value in a manner which will be apparent to those skilled in the art and explained in the above-noted references. Feedback circuit 219 includes an arrangement, symbolized by switch 230, for controllably inhibiting updating of the tap weight in response to a control signal from detector 106 when large amplitude signals are incoming to the repeater. That is to say, when switch 230 in each of adjustment networks 216 is open circuited the weighted replicas do not change in value. Consequently, when a true control signal from detector 106 is supplied to the echo cancelers all of adjustment networks 216 are inhibited and none of the weighted replicas change in value. The weighted replicas of X(K) from adjustment networks 216-0 through 216-N are summed via summing network 220 to generate the echo estimate signal approximating the echo to be cancelled. The echo estimate is supplied via lead 211 to the second input of combining network 210. In this embodiment, the number (N) of taps in echo cancelers 114 and 115 is 24.

Figure 3:
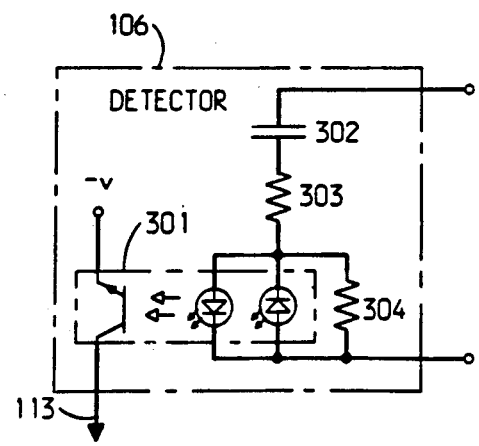
FIG. 3 shows details of the detector employed in FIG. 1.

FIG. 3 shows details of detector 106 which is employed to detect the presence of a "large" out-of-band signal input to the repeater either from 2-wire facility A or 2-wire facility B. Detector 106 includes optical isolator 301 which is of the bidirectional type. Signals developed across either capacitor 105 or capacitor 109 (FIG. 1) are coupled via capacitor 302 to a voltage divider made up of resistors 303 and 304. The values of resistors 303 and 304 are selected to establish a predetermined voltage threshold for activating the light emitting diodes of optical isolator 301. As indicated above, the threshold in this example is approximately 20 volts peak. Thus, when a signal having a peak amplitude of 20 volts or greater is developed across either capacitor 105 or capacitor 109 (FIG. 1), the phototransistor of optical isolator 301 is turned on and the potential $-V$ is supplied via circuit path 113 (FIG. 1) to both of echo cancelers 114 and 115. The potential $-V$ is representative of a logical 1 or a true logical signal. Since detector 106 is an amplitude detector any large signal having sufficient amplitude to exceed the predetermined threshold would obviously not be a "normal" voice frequency signal and will cause generation of the control signal to inhibit updating of the echo canceler impulse response characteristic.

Figure 6:
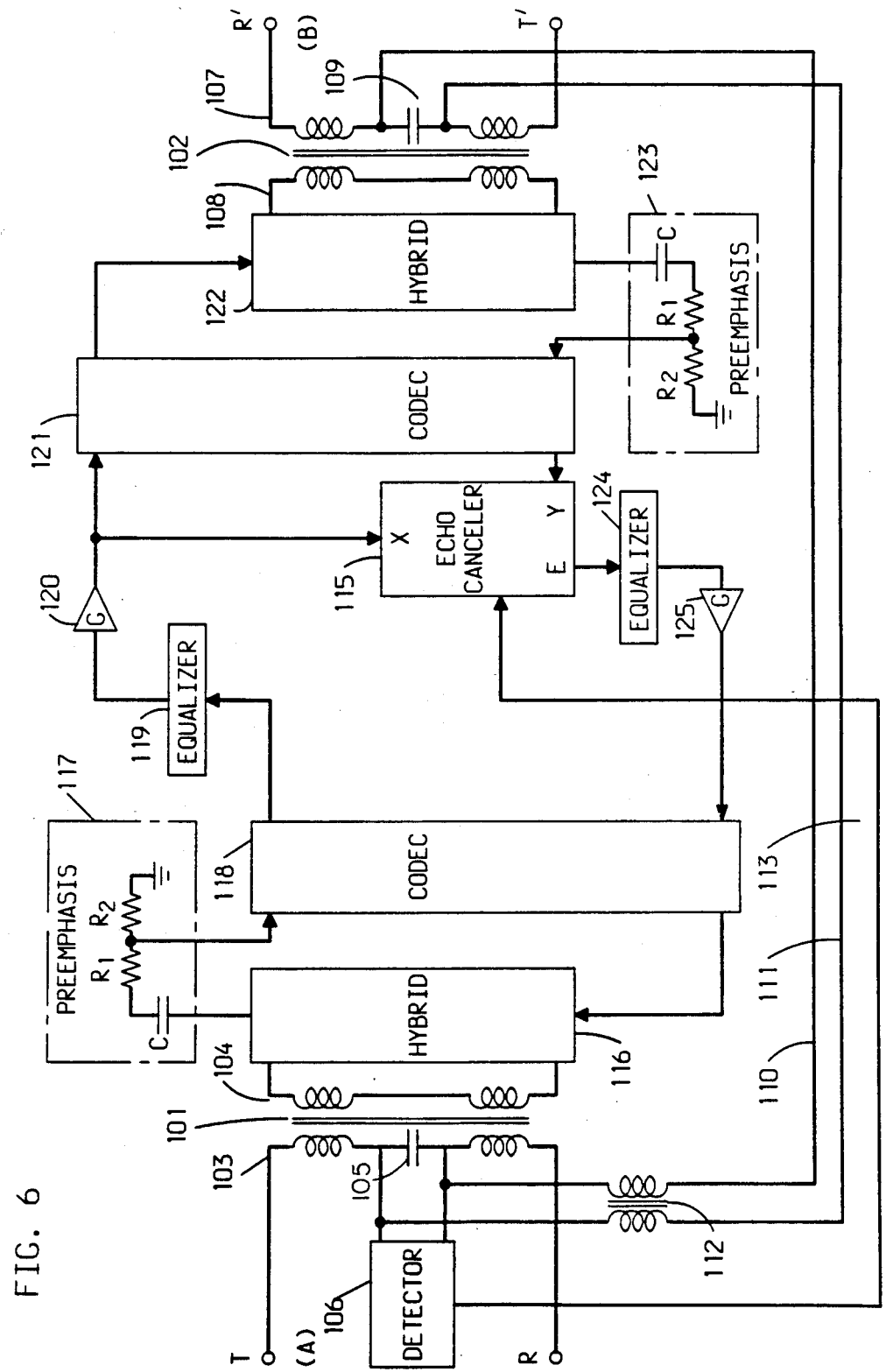
FIG. 6 shows in simplified block diagram form another adaptive voice frequency band repeater including an embodiment of the invention.

FIG. 6 shows in simplified block diagram form another bidirectional voice frequency repeater employing the invention. The elements of the repeater shown in FIG. 6 are identical to those shown in FIG. 1 except echo canceler 114 is eliminated. Accordingly, the details of the repeater shown in FIG. 6 will not be described in detail again.

Although the present invention has been described in simplified block diagram form, a preferred embodiment is realized by appropriately programming a digital signal processor to obtain the CODEC, equalizer, gain unit and echo canceler functions. One such digital signal processor unit is manufactured by AT&T Technologies, Inc. and is described in several articles in *The Bell System Technical Journal*, Vol. 60. No. 7, Part 2, dated September 1981. A prior known repeater employing one such digital signal processor is broadly described in an article entitled, "Digital Signal Solves Hybrid Balance Puzzle", *Telephone Engineer & Management*, Aug. 1, 1983, pages 39–46.

Moreover, the preemphasis circuits may be implemented as digital filters in a signal process unit.

What is claimed is:
1. A signal transmission network including:
   at least first means adapted to connect said transmission network to at least a first bidirectional transmission facility;
   at least first echo canceler means for cancelling echo signals resulting in said transmission network because of said first bidirectional transmission facility, said echo canceler means including signal processor means for generating a predetermind number of amplitude coefficients which form an impulse response characteristic, said signal processor means being adapted to be supplied with an input signal and being responsive to an error signal for generating an estimate of an echo signal to be canceled by adjusting said impulse response characteristic, and means for algebraically combining said echo signal estimate with an outgoing signal to generate said error signal; and
   at least first preemphasis means comprising a high pass filter supplied with signals incoming to said at least first echo canceler means for shaping low frequency signal components as a function of energy in said incoming signals within a voice frequency pass band to obtain a prescribed low frequency roll-off function for voice frequency transmission within said voice frequency pass band so that said amplitude coefficients form an impulse response characteristic to generate said echo signal estimate without being responsive to excessive low frequency components in said incoming signals.

2. The invention as defined in claim 1 wherein said high pass filter comprises a capacitor (C) connected in series with a first resistor ($R_1$) and a second resistor ($R_2$) with an input ($V_{in}$) being supplied to said capacitor and an output ($V_{out}$) being developed across said second resistor and has a high pass frequency characteristic defined by $$V_{out} = V_{in}\left(\frac{j\omega CR_2}{1 + j\omega C(R_1 + R_2)}\right)$$

where
$V_{in}$ is the signal input to the filter,
$V_{out}$ is the signal output from the filter,
C is the value of the capacitor,
$R_1$ is the value of the first resistor,
$R_2$ is the value of the second resistor, and
$\omega = 2\pi f$ where f is the frequency of the signal components.

3. A bidirectional signal transmission network including:
first means adapted for connecting said transmission network to a first bidirectional transmission facility;
second means adapted for connecting said transmission network to a second bidirectional transmission facility;
first echo canceler means for canceling echo signals resulting in said transmission network because of said first bidirectional transmission facility;
second echo canceler means for cancelling echo signals resulting in said transmission network because of said second bidirectional transmission facility;
each of said first and second echo canceler means including signal processing means for generating a predetermined number of amplitude coefficients which form an impulse response characteristic, said signal processor means being adapted to be supplied with an input signal and being responsive to an error signal for generating an estimate of an echo signal to be canceled by adjusting said impulse response characteristic and means for algebraically combining said echo signal estimate with an outgoing signal to generate said error signal;
first preemphasis means comprising a high pass filter supplied with first signals incoming to said first echo canceler means for shaping low frequency signal components as a function of energy in said first signals within a voice frequency passband to obtain a prescribed low frequency roll-off function for voice frequency transmission within said voice frequency pass band so that said first echo canceler means amplitude coefficients form an impulse response characteristic to generate a first echo signal estimate without being responsive to excessive low frequency components in said first signals; and
second preemphasis means comprising a high pass filter supplied with second signals incoming to said second echo canceler means for shaping low frequency signal components as a function of energy in said second signals within said voice frequency pass band to obtain said prescribed low frequency roll-off function so that said second echo canceler means amplitude coefficients form an impulse response characteristic to generate a second echo signal estimate without being responsive to excessive low frequency components in said second signals.

4. The invention as defined in claim 3 wherein said first preemphasis means is connected in circuit so that the first signals supplied thereto include an echo signal developed in said transmission network because of said second bidirectional transmission network and wherein said second preemphasis means is connected in circuit so that the second signals supplied thereto include an echo signal developed in said transmission network because of said first bidirectional transmission facility.

5. The invention as defined in claim 4 wherein each of said high pass filters comprises a capacitor (C) connected in series with a first resistor ($R_1$) and a second resistor ($R_2$) with an input ($V_{in}$) being supplied to said capacitor and an output ($V_{out}$) being developed across said second resistor and has a high pass frequency characteristic defined by $$V_{out} = V_{in}\left(\frac{j\omega CR_2}{1 + j\omega C(R_1 + R_2)}\right)$$

where
$V_{in}$ is the signal input to the filter,
$V_{out}$ is the signal output from the filter,
C is the value of the capacitor,
$R_1$ is the value of the first resistor,
$R_2$ is the value of the second resistor, and
$\omega = 2\pi f$ where f is the frequency of the signal components.

6. A signal transmission network including:
at least first means adapted to connect said transmission network to at least a first bidirectional transmission facility;
at least first echo canceler means for canceling echo signals resulting in said transmission network because of said first bidirectional transmission facility, said echo canceler means including signal processor means for generating a predetermined number of amplitude coefficients which form an impulse response characteristic, said signal processor means being adapted to be supplied with an input signal and being responsive to an error signal for generating an estimate of an echo signal to be cancelled by adjusting said impulse response characteristic, and means for algebraically combining said echo signal estimate with an outgoing signal to generate said error signal;
first preemphasis means comprising a high pass filter connected in circuit to be supplied with signals in a first direction of signal transmission in said transmission network for shaping low frequency signal components as a function of energy in said signals in said first direction of signal transmission within a voice frequency pass band to obtain a prescribed low frequency roll-off function for voice frequency transmission within said voice frequency pass band; and
second preemphasis means comprising a high pass filter connected in circuit to be supplied with signals in a second direction of signal transmission in said transmission network for shaping low frequency signal components as a function of energy in said signals in said second direction of signal transmission within said voice frequency passband to obtain said prescribed low frequency roll-off function;
said first and second preemphasis means being operational so that said amplitude coefficients form an impulse response characteristic to generate said echo signal estimate without being responsive to excessive low frequency components in said signals in said first and second directions of signal transmission.

7. The invention as defined in claim 6 wherein each of said high pass filters comprises a capacitor (C) connected in series with a first resistor (R$_1$) and a second resistor (R$_2$) with an input (V$_{in}$) being supplied to said capacitor and an output (V$_{out}$) being developed across said second resistor and has a high pass frequency characteristic defined by $$V_{out} = V_{in}\left(\frac{j\omega CR_2}{1 + j\omega C(R_1 + R_2)}\right).$$

where
V$_{in}$ is the signal input to the filter,
V$_{out}$ is the signal output from the filter,
C is the value of the capacitor,
R$_1$ is the value of the first resistor,
R$_2$ is the value of the second resistor, and
$\omega = 2\pi f$ where f is the frequency of the signal components.

8. A bidirectional signal transmission network including:
first means adapted for connecting said transmission network to a first bidirectional transmission facility;
second means adapted for connecting said transmission network to a second bidirectional transmission facility;
first echo canceler means for cancelling echo signals resulting in said transmission network because of said first bidirectional transmission facility;
second echo canceler means for cancelling echo signals resulting in said transmission network because of said second bidirectional facility;
each of said first and second echo canceler means including signal processing means for generating a predetermined number of amplitude coefficients which form an impulse response characteristic, said signal processor means being adapted to be supplied with an input signal and being responsive to an error signal for generating an estimate of an echo signal to be cancelled by adjusting said impulse response characteristic and means for algebraically combining said echo signal estimate with an outgoing signal to generate said error signal;
first preemphasis means comprising a high pass filter connected in circuit to be supplied with signals in a first direction of transmission in said transmission network including signals incoming to said first echo canceler means for shaping low frequency signal components as a function of energy in said signals in said first direction of transmission within a voice frequency pass band to obtain a prescribed low frequency roll-off function for voice frequency transmission within said voice frequency passband so that said first echo canceler means amplitude coefficients form an impulse response characteristic to generate a first echo signal estimate without being responsive to excessive low frequency components in said signals incoming to said first echo canceler means; and
second preemphasis means comprising a high pass filter connected in circuit to be supplied with signals in a second direction of transmission in said transmission network including signals incoming to said second echo canceler means for shaping low frequency signal components in said signals as a function of energy in said second direction of transmission within said voice frequency passband to obtain said prescribed low frequency roll-off function so that said second echo canceler means amplitude coefficients form an impulse response characteristic to generate a second echo signal estimate without being responsive to excessive low frequency components in said signals incoming to said second echo canceler means.

9. The invention as defined in claim 8 wherein said first preemphasis means is connected in circuit so that the signals supplied thereto include an echo signal developed in said transmission network because of said second bidirectional transmission network and wherein said second preemphasis means is connected in circuit so that the signals supplied thereto include an echo signal developed in said transmission network because of said first bidirectional transmission facility.

10. The invention as defined in claim 9 wherein each of said high pass filters comprises a capacitor (C) connected in series with a first resistor (R$_1$) and a second resistor (R$_2$) with an input (V$_{in}$) being supplied to said capacitor and an output (V$_{out}$) being developed across said resistor and has a high pass frequency characteristic defined by $$V_{out} = V_{in}\left(\frac{j\omega CR_2}{1 + j\omega C(R_1 + R_2)}\right)$$

where
V$_{in}$ is the signal input to the filter,
V$_{out}$ is the signal output from the filter,
C is the value of the capacitor,
R$_1$ is the value of the first resistor,
R$_2$ is the value of the second resistor, and
$\omega = 2\pi f$ where f is the frequency of the signal components.

* * * * *